(12) United States Patent
Peng et al.

(10) Patent No.: US 12,035,294 B2
(45) Date of Patent: Jul. 9, 2024

(54) COMMUNICATION METHOD AND APPARATUS

(71) Applicant: Huawei Technologies Co., Ltd., Shenzhen (CN)

(72) Inventors: Wenjie Peng, Shanghai (CN); Jun Wang, Shanghai (CN); Mingzeng Dai, Shenzhen (CN); Dongdong Wei, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 352 days.

(21) Appl. No.: 17/486,636

(22) Filed: Sep. 27, 2021

(65) Prior Publication Data
US 2022/0015103 A1 Jan. 13, 2022

Related U.S. Application Data

(63) Continuation of application No. PCT/CN2020/071134, filed on Jan. 9, 2020.

(30) Foreign Application Priority Data

Mar. 28, 2019 (CN) .......................... 201910245845.X

(51) Int. Cl.
H04W 72/0453 (2023.01)
H04W 72/20 (2023.01)
(Continued)

(52) U.S. Cl.
CPC ....... *H04W 72/0453* (2013.01); *H04W 72/20* (2023.01); *H04W 72/23* (2023.01);
(Continued)

(58) Field of Classification Search
CPC . H04W 72/0453; H04W 76/14; H04W 72/25; H04W 72/23; H04W 92/18
See application file for complete search history.

(56) References Cited

U.S. PATENT DOCUMENTS 11,375,498 B2 * 6/2022 Zhao .................... H04W 72/044
11,723,091 B2 * 8/2023 Zhao ....................... H04W 8/24
370/329

FOREIGN PATENT DOCUMENTS

CN 106793090 A 5/2017
CN 107371193 A 11/2017
(Continued)

OTHER PUBLICATIONS

Spreadtrum Communications, "Negotiation of TX resource pool(s) for SL unicast," 3GPP TSG-RAN WG2 Meeting #106, Reno, US, R2-1905677, total 2 pages, 3rd Generation Partnership Project, Valbonne, France (May 13-17, (2019).

(Continued)

*Primary Examiner* — Chandrahas B Patel
(74) *Attorney, Agent, or Firm* — Leydig, Voit & Mayer, Ltd.

(57) ABSTRACT

A first terminal receives first sidelink (SL) carrier configuration information from a second terminal, the first SL carrier configuration information includes first bandwidth part (BWP) configuration information, and the first BWP configuration information includes one or more first resource pools; the first terminal performs unicast connection communication with the second terminal based on the first BWP configuration information.

15 Claims, 8 Drawing Sheets

(51) Int. Cl.
*H04W 72/23* (2023.01)
*H04W 72/25* (2023.01)
*H04W 76/14* (2018.01)
*H04W 92/18* (2009.01)

(52) U.S. Cl.
CPC .......... *H04W 72/25* (2023.01); *H04W 76/14* (2018.02); *H04W 92/18* (2013.01)

(56) References Cited

FOREIGN PATENT DOCUMENTS

| | | |
|---|---|---|
| CN | 108605317 A | 9/2018 |
| CN | 108668371 A | 10/2018 |
| CN | 109391972 A | 2/2019 |
| CN | 109392181 A | 2/2019 |
| EP | 3457747 A1 | 3/2019 |
| EP | 3836686 A1 | 6/2021 |
| EP | 3879891 A1 | 9/2021 |
| EP | 3902353 A1 | 10/2021 |
| WO | 2016144574 A1 | 9/2016 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.4.0, total 933 pages, 3rd Generation Partnership Project, Valbonne, France (Dec. 2018).

ZTE, "Mode 1 resource allocation schemes on sidelink," 3GPP TSG RAN WG1 #97, Reno, Nevada, US, R1-1907129, total 4 pages, 3rd Generation Partnership Project, Valbonne, France (May 13-17, 2019).

"3rd Generation Partnership Project; Technical Specification Group Radio Access Network; Evolved Universal Terrestrial Radio Access (E-UTRA); Multiplexing and channel coding (Release 15)," 3GPP TS 36.212 V15.4.0, total 247 pages, 3rd Generation Partnership Project, Valbonne, France (Dec. 2018).

ZTE, Sanechips, "Discussion on Uu based resource allocation/ configuration for NR V2X," 3GPP TSG RAN WG1 Meeting #95, Spokane, USA, R1-1813179, total 5 pages, 3rd Generation Partnership Project, Valbonne, France (Nov. 12-16, 2018).

"3rd Generation Partnership Project; Technical Specification Group Radio Access Network; Evolved Universal Terrestrial Radio Access (E-UTRA); Physical layer procedures (Release 15)," 3GPP TS 36.213 V15.4.0, total 550 pages, 3rd Generation Partnership Project, Valbonne, France (Dec. 2018).

Ericsson, "On Mode 2 Resource Allocation for NR Sidelink," 3GPP TSG-RAN WG1 Meeting #94-Bis, Chengdu, China, Tdoc R1-1811594, total 10 pages, 3rd Generation Partnership Project, Valbonne, France (Oct. 8-12, 2018).

\* cited by examiner

COMMUNICATION METHOD AND APPARATUS

CROSS-REFERENCE TO RELATED APPLICATIONS

This application a continuation of International Application No. PCT/CN2020/071134, filed on Jan. 9, 2020, which claims priority to Chinese Patent Application No. 201910245845.X, filed on Mar. 28, 2019. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

Vehicle-to-everything (V2X) refers to interconnecting a vehicle to an outside world, for example, interconnections and communication between vehicles, a vehicle and a person, a vehicle and a roadside infrastructure, and a vehicle and a network, by using an apparatus configured on the vehicle and various communication technologies. Currently, a sidelink (SL) technology is introduced to the vehicle-to-everything. For a new radio (NR) V2X SL, the concept of bandwidth part (BWP) is introduced to the SL in a standard.

In a BWP framework, resource configuration on the NR V2X SL is performed in a form of a resource pool (RP). A carrier has a large bandwidth and may even cover a plurality of frequencies, and different services have different requirements on frequencies. Therefore, a plurality of resource pools can be supported in one BWP.

However, BWP configurations obtained by two terminal devices (UE) in a unicast connection may not match, resulting in a communication failure. For example, as shown in FIG. 1, a BWP of UE 1 includes a resource pool #2, a resource pool #3, and a resource pool #4, and a BWP of UE 2 includes a resource pool #1, a resource pool #2, and the resource pool #3. When the UE 2 sends data in the resource pool #1, the UE 1 cannot receive the data, or when the UE 1 sends data in the resource pool #4, the UE 2 cannot receive the data. As a result, communication fails.

SUMMARY

Embodiments of this application provide a communication method and apparatus, to ensure reliability of unicast connection communication between terminals.

To achieve the foregoing objective, the following technical solutions are used in the embodiments of this application.

According to a first aspect of the embodiments of this application, a communication method is provided. The method includes: receiving, by a first terminal, first sidelink SL carrier configuration information sent by a second terminal, where a first sidelink is a wireless communication link between the first terminal and the second terminal, the first SL carrier configuration information includes first bandwidth part BWP configuration information, and the first BWP configuration information includes one or more first resource pools; and performing, by the first terminal, unicast connection communication with the second terminal based on the first BWP configuration information. It may be understood that when performing the unicast connection communication with the second terminal based on the first BWP configuration information, the first terminal may obtain an SL resource to perform the unicast connection communication, where the SL resource may be an overlapping time-frequency resource in BWP configuration information of the first terminal and BWP configuration information of the second terminal. According to this solution, when the first terminal performs the unicast connection communication with the second terminal based on second BWP configuration information of the second terminal, a sending resource pool used by the first terminal to send data falls within a range of a receiving resource pool used by the second terminal to receive data, that is, the second terminal can receive data sent by the first terminal. This ensures reliability of the unicast connection communication between the first terminal and the second terminal. It should be noted that the plurality of first resource pools are a plurality of resource pools that are included in the first BWP configuration information and that have different time-frequency resources.

With reference to the first aspect, in a possible implementation, a first SL carrier is a carrier corresponding to a unicast connection. According to this solution, the second terminal sends the carrier corresponding to the unicast connection to the first terminal, so that the first terminal can perform the unicast connection communication based on the carrier corresponding to the unicast connection.

With reference to the first aspect and the foregoing possible implementation, in another possible implementation, the performing, by the first terminal, unicast connection communication with the second terminal based on the first BWP configuration information includes: obtaining, by the first terminal, a target resource pool based on the first BWP configuration information and the second BWP configuration information, where the target resource pool is used by the first terminal to perform the unicast connection communication with the second terminal, the second BWP configuration information belongs to the first SL carrier configuration information, and the second BWP configuration information includes one or more second resource pools; and performing, by the first terminal, the unicast connection communication with the second terminal based on the target resource pool. According to this solution, when the overlapping time-frequency resource in the first BWP configuration information and the second BWP configuration information is obtained based on the first BWP configuration information and the second BWP configuration information, and the communication is performed based on the overlapping time-frequency resource. This ensures that data sent by the first terminal can be received by the second terminal, and ensures the reliability of the unicast connection communication between the first terminal and the second terminal. It should be noted that the plurality of second resource pools are a plurality of resource pools that are included in the second BWP configuration information and that have different time-frequency resources.

With reference to the first aspect and the foregoing possible implementation, in another possible implementation, the performing, by the first terminal, unicast connection communication with the second terminal based on the first BWP configuration information includes: sending, by the first terminal, the first BWP configuration information and first indication information to a radio access network device, where the first indication information is used to indicate the unicast connection. According to this solution, the first terminal sends the first BWP configuration information of the second terminal to the radio access network device, where the first BWP configuration information may be used as a limitation on scheduling or configuring a resource by the radio access network device.

With reference to the first aspect and the foregoing possible implementation, in another possible implementation, the method further includes: receiving, by the first terminal, third BWP configuration information sent by the radio access network device, where the third BWP configuration information and the first BWP configuration information correspond to a same SL carrier; and performing, by the first terminal, the unicast connection communication with the second terminal based on the third BWP configuration information. According to this solution, because the third BWP configuration information and the first BWP configuration information correspond to the same SL carrier, when the first terminal performs the unicast connection communication with the second terminal based on the third BWP configuration information, the reliability of the unicast connection communication can be ensured.

With reference to the first aspect and the foregoing possible implementation, in another possible implementation, the first resource pool is a target resource pool, and the target resource pool is used by the first terminal to perform the unicast connection communication with the second terminal. According to this solution, the second terminal sends, to the first terminal, a resource pool including an overlapping time-frequency resource in the first resource pool and the second resource pool, so that it can be ensured that the first terminal can receive data sent by the second terminal, and the second terminal can also receive data sent by the first terminal, thereby ensuring the reliability of the unicast connection communication between the first terminal and the second terminal.

With reference to the first aspect and the foregoing possible implementation, in another possible implementation, the foregoing method further includes: sending, by the first terminal, the second BWP configuration information to the second terminal. According to this solution, the first terminal sends the second BWP configuration information to the second terminal, so that the second terminal can perform the unicast connection communication based on the second BWP configuration information.

With reference to the first aspect and the foregoing possible implementation, in another possible implementation, the method further includes: sending, by the first terminal, the target resource pool and first indication information to a radio access network device, where the first indication information is used to indicate the unicast connection. According to this solution, the radio access network device may schedule a resource based on unicast connection information and the target resource pool that are sent by the first terminal.

With reference to the first aspect and the foregoing possible implementation, in another possible implementation, the foregoing method further includes: sending, by the first terminal, the target resource pool to the second terminal. According to this solution, the second terminal can perform the unicast connection communication with the first terminal based on the target resource pool. It may be understood that the target resource pool may be an intersection set of a receiving resource pool used by the first terminal to receive data and a sending resource pool used by the second terminal to send data, so that it can be ensured that the sending resource pool used by the second terminal to send data belongs to the receiving resource pool used by the first terminal to receive data. That is, the first terminal can receive data sent by the second terminal, thereby ensuring the reliability of the unicast connection communication between the first terminal and the second terminal.

According to a second aspect of the embodiments of this application, a communication method is provided. The method includes: receiving, by a radio access network device, first bandwidth part BWP configuration information and first indication information that are sent by a first terminal, where the first BWP configuration information belongs to first sidelink SL carrier configuration information, a first sidelink is a wireless communication link between the first terminal and a second terminal, the first BWP configuration information is BWP configuration information of the second terminal, the first BWP configuration information includes one or more first resource pools, and the first indication information is used to indicate a unicast connection between the first terminal and the second terminal; and scheduling, by the radio access network device, a target SL resource based on the first BWP configuration information, where the target SL resource is a time-frequency resource in a target resource pool, and the target resource pool is used by the first terminal to perform unicast connection communication with the second terminal. According to this solution, because the radio access network device considers a first BWP configuration of the second terminal when scheduling the resource, a resource for sending data by the first terminal may be limited to a time-frequency domain range of the scheduled resource, to ensure that the second terminal can receive data sent by the first terminal.

With reference to the second aspect, in a possible implementation, the method further includes: obtaining, by the radio access network device, second BWP configuration information based on the first BWP configuration information, where the second BWP configuration information and the first BWP configuration information correspond to a same SL carrier; and sending, by the radio access network device, the second BWP configuration information to the first terminal. According to this solution, because the radio access network device considers the first BWP configuration of the second terminal when configuring a second BWP for the first terminal, a sending resource pool in the second BWP may be limited to a time-frequency domain range of a receiving resource pool in a first BWP, to ensure that the second terminal can receive data sent by the first terminal.

With reference to the second aspect and the foregoing possible implementation, in another possible implementation, the first resource pool is the target resource pool. According to this solution, when scheduling the resource, the radio access network device can limit the scheduled resource to a time-frequency domain range of the target resource pool, to ensure reliability of the communication between the first terminal and the second terminal in the unicast connection.

According to a third aspect of the embodiments of this application, a communication apparatus is provided. The communication apparatus includes a processing module and a transceiver module, where the transceiver module is configured to receive first sidelink SL carrier configuration information sent by a second terminal, where a first sidelink is a wireless communication link between the communication apparatus and the second terminal, the first SL carrier configuration information includes first bandwidth part BWP configuration information, and the first BWP configuration information includes one or more first resource pools; and the processing module is configured to perform, through the transceiver module, unicast connection communication with the second terminal based on the first BWP configuration information.

With reference to the third aspect, in a possible implementation, a first SL carrier is a carrier corresponding to a unicast connection.

With reference to the third aspect and the foregoing possible implementation, in another possible implementation, the processing module is specifically configured to: obtain a target resource pool based on the first BWP configuration information and second BWP configuration information, where the target resource pool is used by the communication apparatus to perform the unicast connection communication with the second terminal, the second BWP configuration information belongs to the first SL carrier configuration information, and the second BWP configuration information includes one or more second resource pools; and perform, through the transceiver module, the unicast connection communication with the second terminal based on the target resource pool.

With reference to the third aspect and the foregoing possible implementation, in another possible implementation, the transceiver module is further configured to send the first BWP configuration information and first indication information to a radio access network device, where the first indication information is used to indicate the unicast connection.

With reference to the third aspect and the foregoing possible implementation, in another possible implementation, the transceiver module is further configured to receive third BWP configuration information sent by the radio access network device, where the third BWP configuration information and the first BWP configuration information correspond to a same SL carrier; and the processing module is specifically configured to perform, through the transceiver module, the unicast connection communication with the second terminal based on the third BWP configuration information.

With reference to the third aspect and the foregoing possible implementation, in another possible implementation, the first resource pool is a target resource pool, and the target resource pool is used by the communication apparatus to perform the unicast connection communication with the second terminal.

With reference to the third aspect and the foregoing possible implementation, in another possible implementation, the transceiver module is further configured to send the second BWP configuration information to the second terminal.

With reference to the third aspect and the foregoing possible implementation, in another possible implementation, the transceiver module is further configured to send the target resource pool and first indication information to a radio access network device, where the first indication information is used to indicate the unicast connection.

With reference to the third aspect and the foregoing possible implementation, in another possible implementation, the transceiver module is further configured to send the target resource pool to the second terminal.

According to a fourth aspect of the embodiments of this application, a communication apparatus is provided. The communication apparatus includes a transceiver module and a processing module, where
the transceiver module is configured to receive first bandwidth part BWP configuration information and first indication information that are sent by a first terminal, where the first BWP configuration information belongs to first sidelink SL carrier configuration information, a first sidelink is a wireless communication link between the first terminal and a second terminal, the first BWP configuration information is BWP configuration information of the second terminal, the first BWP configuration information includes one or more first resource pools, and the first indication information is used to indicate a unicast connection between the first terminal and the second terminal; and the processing module is configured to schedule a target SL resource based on the first BWP configuration information, where the target SL resource is a time-frequency resource in a target resource pool, and the target resource pool is used by the first terminal to perform unicast connection communication with the second terminal.

With reference to the fourth aspect, in a possible implementation, the processing module is specifically configured to obtain second BWP configuration information based on the first BWP configuration information, where the second BWP configuration information and the first BWP configuration information correspond to a same SL carrier; and the transceiver module is further configured to send the second BWP configuration information to the first terminal.

With reference to the fourth aspect and the foregoing possible implementation, in another possible implementation, the first resource pool is the target resource pool.

According to a fifth aspect of the embodiments of this application, a communication method is provided. The method includes: receiving, by a first terminal, one or more pieces of sidelink SL carrier configuration information sent by a radio access network device, where the SL carrier configuration information includes bandwidth part BWP configuration information, the BWP configuration information includes one or more resource pools, and one resource pool includes one or more subchannels; receiving, by the first terminal, downlink control information DCI sent by the radio access network device, where the DCI includes first indication information, the first indication information is used to indicate a time-frequency resource on a first SL carrier in one or more SL carriers, and the first SL carrier is an SL carrier scheduled by the radio access network device; and sending, by the first terminal, data to the second terminal on the time-frequency resource based on the first indication information. According to this solution, when one BWP includes a plurality of resource pools, a specific time-frequency resource position indicated by the radio access network device can be determined based on the DCI.

With reference to the fifth aspect, in a possible implementation, the first indication information includes second indication information and third indication information, the second indication information is used to indicate the first SL carrier, and the third indication information includes a minimum index of a subchannel scheduled by the radio access network device. According to this solution, the SL carrier scheduled by the radio access network device and the minimum index of the subchannel scheduled by the radio access network device can be determined based on the second indication information and the third indication information.

With reference to the fifth aspect and the foregoing possible implementation, in another possible implementation, a configured subchannel of the first terminal is independently numbered in a resource pool, the first indication information further includes fourth indication information, and the fourth indication information is used to indicate the resource pool scheduled by the radio access network device. According to this solution, when the subchannel is independently numbered in the resource pool, a specific position of a time-frequency domain resource scheduled by the radio access network device can be determined based on the first indication information.

With reference to the fifth aspect and the foregoing possible implementation, in another possible implementation, the method further includes: uniformly numbering, by the first terminal, a subchannel of the one or more resource pools in the BWP configuration information from a low frequency to a high frequency. According to this solution, subchannels of one or more resource pools in one BWP are uniformly numbered from a low frequency to a high frequency, to determine a specific position of a time-frequency domain resource scheduled by the radio access network device.

With reference to the fifth aspect and the foregoing possible implementation, in another possible implementation, the time-frequency resource includes a time-frequency resource of the one or more resource pools in the BWP configuration information. According to this solution, the time-frequency resource scheduled by the radio access network device may include time-frequency resources in a plurality of resource pools.

According to a sixth aspect of the embodiments of this application, a communication apparatus is provided. The communication apparatus includes a transceiver module and a processing module, where the transceiver module is configured to receive one or more pieces of sidelink SL carrier configuration information sent by a radio access network device, where the SL carrier configuration information includes bandwidth part BWP configuration information, the BWP configuration information includes one or more resource pools, and one resource pool includes one or more subchannels, where the transceiver module is further configured to receive downlink control information DCI sent by the radio access network device, where the DCI includes first indication information, the first indication information is used to indicate a time-frequency resource on a first SL carrier in one or more SL carriers, and the first SL carrier is an SL carrier scheduled by the radio access network device; and the processing module is configured to send, through the transceiver module, data to a second terminal on the time-frequency resource based on the first indication information.

With reference to the sixth aspect, in a possible implementation, the first indication information includes second indication information and third indication information, the second indication information is used to indicate the first SL carrier, and the third indication information includes a minimum index of a subchannel scheduled by the radio access network device.

With reference to the sixth aspect and the foregoing possible implementation, in another possible implementation, a configured subchannel of the communication apparatus is independently numbered in a resource pool, the first indication information further includes fourth indication information, and the fourth indication information is used to indicate the resource pool scheduled by the radio access network device.

With reference to the sixth aspect and the foregoing possible implementation, in another possible implementation, the processing module is further configured to uniformly number a subchannel of the one or more resource pools in the BWP configuration information from a low frequency to a high frequency.

With reference to the sixth aspect and the foregoing possible implementation, in another possible implementation, the time-frequency resource includes a time-frequency resource of the one or more resource pools in the BWP configuration information.

According to a seventh aspect of the embodiments of this application, a communication method is provided. The method includes: receiving, by a terminal, first information sent by a radio access network device, where the first information includes one or more pieces of first sidelink SL carrier configuration information, the first SL carrier configuration information includes first bandwidth part BWP configuration information, and the first BWP configuration information includes one or more first resource pools; and selecting, by the terminal, second SL carrier configuration information from the one or more pieces of first SL carrier configuration information, where a second SL carrier is a carrier in one or more first SL carriers, the second SL carrier configuration information includes second BWP configuration information, and the second BWP configuration information includes one or more second resource pools. According to this solution, a BWP actually used by the terminal can be selected from BWP configurations broadcast by the radio access network device, thereby ensuring reliability of service transmission.

With reference to the seventh aspect, in a possible implementation, the first information further includes a channel busy ratio CBR threshold, and the second resource pool is a resource pool whose CBR measurement value is greater than or equal to the CBR threshold in the first resource pool. According to this solution, a resource pool can be selected based on a channel busy ratio.

With reference to the seventh aspect and the foregoing possible implementation, in another possible implementation, the first information further includes a service priority corresponding to the first SL carrier, and the second SL carrier is an SL carrier corresponding to a service whose service priority is higher than a preset threshold in the one or more first SL carriers. According to this solution, a resource pool can be selected based on a service priority, so that when a capability of the terminal is insufficient to cover resource pools corresponding to all interested frequencies, a frequency corresponding to a service having a higher service priority is preferentially selected.

With reference to the seventh aspect and the foregoing possible implementation, in another possible implementation, the first information is carried in a broadcast message. According to this solution, the selection can be performed from the BWP configurations broadcast by the radio access network device.

According to an eighth aspect of the embodiments of this application, a communication apparatus is provided. The communication apparatus includes a transceiver module and a processing module, where the transceiver module is configured to receive first information sent by a radio access network device, where the first information includes one or more pieces of first sidelink SL carrier configuration information, the first SL carrier configuration information includes first bandwidth part BWP configuration information, and the first BWP configuration information includes one or more first resource pools; and the processing module is configured to select second SL carrier configuration information from the one or more pieces of first SL carrier configuration information, where a second SL carrier is a carrier in one or more first SL carriers, the second SL carrier configuration information includes second BWP configuration information, and the second BWP configuration information includes one or more second resource pools.

With reference to the eighth aspect, in a possible implementation, the first information further includes a channel busy ratio CBR threshold, and the second resource pool is a resource pool whose CBR measurement value is greater than or equal to the CBR threshold in the first resource pool.

With reference to the eighth aspect and the foregoing possible implementation, in another possible implementation, the first information further includes a service priority corresponding to the first SL carrier, and the second SL carrier is an SL carrier corresponding to a service whose service priority is higher than a preset threshold in the one or more first SL carriers.

With reference to the eighth aspect and the foregoing possible implementation, in another possible implementation, the first information is carried in a broadcast message.

For effect descriptions of the second aspect and the implementations of the second aspect, refer to descriptions of corresponding effects of the first aspect and the implementations of the first aspect. For effect descriptions of the fourth aspect and the implementations of the fourth aspect, refer to descriptions of corresponding effects of the second aspect and the implementations of the second aspect. For effect descriptions of the sixth aspect and the implementations of the sixth aspect, refer to descriptions of corresponding effects of the fifth aspect and the implementations of the fifth aspect. For effect descriptions of the eighth aspect and the implementations of the eighth aspect, refer to descriptions of corresponding effects of the seventh aspect and the implementations of the seventh aspect. Details are not described herein again.

According to a ninth aspect of the embodiments of this application, a computer storage medium is provided. The computer storage medium has computer program code. When the computer program code is run on a processor, the processor is enabled to perform the communication method according to any one of the foregoing aspects.

According to a tenth aspect of the embodiments of this application, a computer program product is provided. The program product stores computer software instructions executed by the foregoing processor. The computer software instructions include a program used to perform the solutions in the foregoing aspects.

According to an eleventh aspect of the embodiments of this application, a communication apparatus is provided. The apparatus includes a transceiver, a processor, and a memory. The transceiver is configured to send and receive information, or is configured to communicate with another network element. The memory is configured to store computer-executable instructions. The processor is configured to execute the computer-executable instructions to implement the communication method according to the first aspect, the fifth aspect, or the seventh aspect.

According to a twelfth aspect of the embodiments of this application, a communication apparatus is provided. The apparatus includes a transceiver, a processor, and a memory. The transceiver is configured to send and receive information, or is configured to communicate with another network element. The memory is configured to store computer-executable instructions. The processor is configured to execute the computer-executable instructions to implement the communication method according to the second aspect.

According to a thirteenth aspect of the embodiments of this application, a communication apparatus is provided. The apparatus exists in a product form of a chip. A structure of the apparatus includes a processor, and may further include a memory. The memory is configured to: be coupled to the processor, and store program instructions and data that are necessary for the apparatus. The processor is configured to execute the program instructions stored in the memory, so that the apparatus performs a function of the apparatus in the foregoing method.

DESCRIPTION OF EMBODIMENTS

The following describes the technical solutions in the embodiments of this application with reference to the accompanying drawings in the embodiments of this application. In this application, "at least one" means one or more, and "a plurality of" means two or more than two. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one item (piece) of the following" or a similar expression thereof means any combination of these items, including a singular item (piece) or any combination of plural items (pieces). For example, at least one of a, b, or c may represent a; b; c; a and b; a and c; b and c; or a, b, and c, where a, b, and c may be singular or plural. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity and an execution sequence. For example, "first" in a first terminal and "second" in a second terminal in the embodiments of this application are merely used to distinguish between different terminals.

It should be noted that, in this application, the word "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

Figure 1:
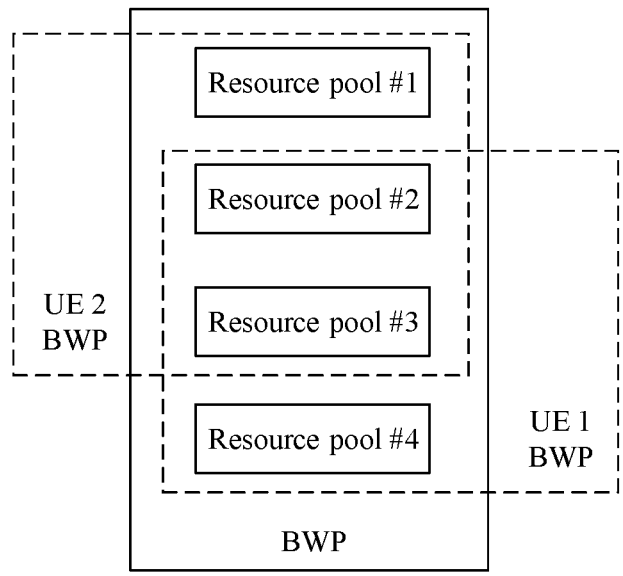
FIG. 1 is a schematic diagram of a configuration of a resource pool between terminals in a conventional technology.
Figure 2:
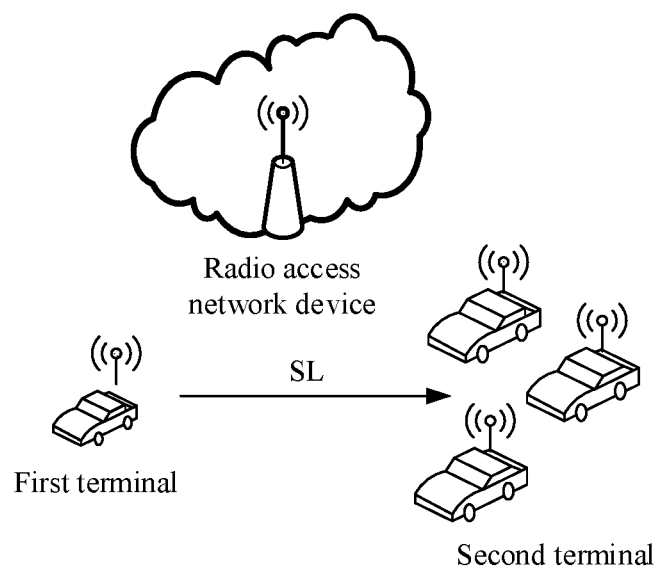
FIG. 2 is a schematic diagram of a V2X communication scenario according to an embodiment of this application.

The embodiments of this application provide a communication method, and the communication method is applied to a V2X communication scenario shown in FIG. 2. As shown in FIG. 2, a first device and a second device communicate with each other over a sidelink (SL). The sidelink is a secondary link in a V2X network. The V2X network further includes an uplink and a downlink in addition to the secondary link.

For example, V2X communication includes vehicle-to-vehicle (Vehicle-to-Vehicle, V2V) communication, vehicle-to-infrastructure (V21) communication, vehicle-to-pedestrian (V2P) communication, and vehicle-to-application server (V2N) communication. V2V communication between the first device and the second device that are both vehicles is merely used as an example in FIG. 2. A specific V2X communication scenario is not limited in the embodiments of this application.

For example, in a V2X network, there are two manners in which a terminal obtains a V2X SL resource. One manner is a radio access network device scheduling manner. In this manner, the terminal needs to enter a radio resource control (RRC) connected mode to transmit data. A terminal supporting a V2X function may request, from a radio access network device, a resource used for sending data, and the radio access network device allocates a V2X SL resource as required. This resource obtaining mode is referred to as a mode 3 in long term evolution (LTE) V2X, and is referred to as a mode 1 in NR V2X. For example, when a resource is obtained in the mode 1 in NR V2X, the radio access network device may configure a resource pool used by the terminal, and then the radio access network device allocates, over a physical downlink control channel PDCCH (PDCCH) based on a sidelink buffer status report (BSR) reported by the terminal, specific resource position information in the configured resource pool to the terminal. For example, downlink control information (DCI) may be used to indicate position information of a resource used by a PC5 interface of the terminal to send data. The PC5 interface is a communication interface between terminals. For example, the radio access network device may be a base station, or a device in a network that provides radio access.

Another manner is that a terminal autonomously selects a resource. In this manner, the terminal may select a resource, from a V2X SL resource that is broadcast by a radio access network device, that is preconfigured by using a control function (CF), or that is configured by using RRC function, to transmit data. This resource obtaining mode is referred to as a mode 4 in LTE V2X, and is referred to as a mode 2 in NR V2X.

It should be noted that a manner in which the terminal obtains the V2X SL resource is not limited in the embodiments of this application. To be specific, the terminal may obtain the V2X SL resource in any one of the foregoing mode 1 to mode 4 to transmit data.

For example, a resource configuration of the terminal over an NR V2X SL may include one or more SL carriers. One SL carrier may include one or more bandwidth parts (BWP). One BWP may include one or more resource pools. One resource pool may include one or more subchannels, and quantities of subchannels in different resource pools in one BWP may be the same or different. This is not limited in the embodiments of this application.

For example, a unicast connection exists between the first terminal and the second terminal shown in FIG. 2, and unicast connection communication may be performed between the first terminal and the second terminal. It should be noted that when the unicast connection communication is performed between the first terminal and the second terminal, a sending resource pool used when the first terminal sends data needs to belong to a receiving resource pool used when the second terminal receives data, to ensure that the second terminal can receive data sent by the first terminal.

Figure 3:
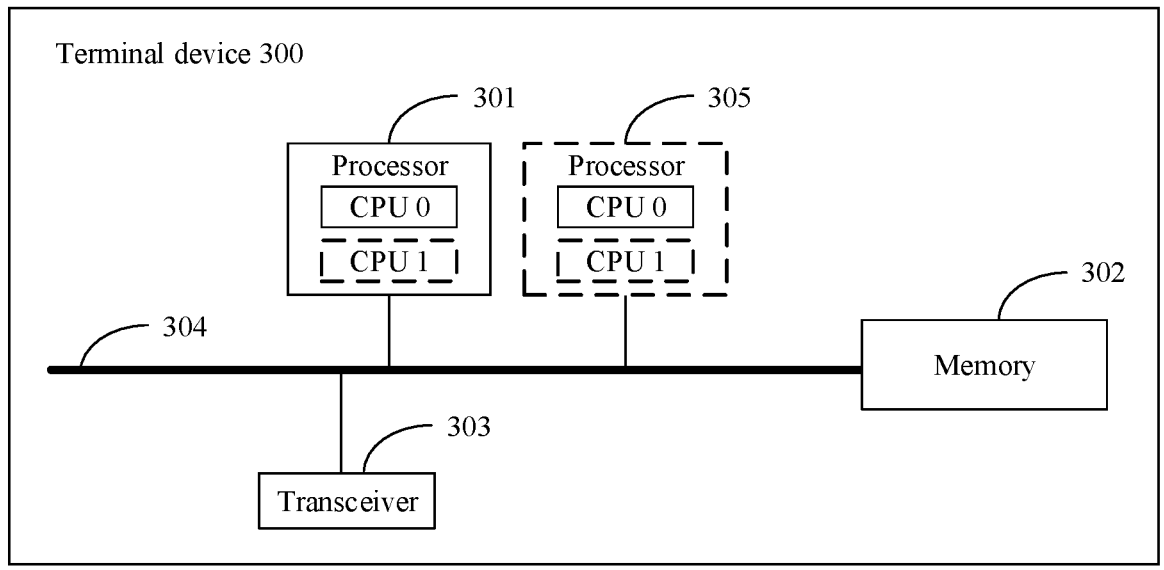
FIG. 3 is a schematic structural diagram of a terminal device according to an embodiment of this application.

FIG. 3 shows a terminal device according to an embodiment of this application. The terminal device may be a vehicle, may be an in-vehicle communication apparatus or a vehicle-mounted terminal installed on a vehicle to assist in driving of the vehicle, or a chip in the in-vehicle communication apparatus or the in-vehicle terminal. The in-vehicle terminal may be a device configured to implement a wireless communication function, for example, a terminal or a chip that can be used in the terminal. The terminal device may be user equipment UE, an access terminal, a terminal unit, a terminal station, a mobile station, a remote station, a remote terminal, a mobile device, a wireless communication device, a terminal agent, a terminal apparatus, or the like in a 5G network or a future evolved PLMN. An access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The vehicle-mounted terminal may be movable or fixed.

As shown in FIG. 3, the terminal device 300 includes at least one processor 301, a memory 302, a transceiver 303, and a communication bus 304.

The following describes components of the terminal device in detail with reference to FIG. 3.

The processor 301 is a control center of the terminal device, and may be a processor, or may be a collective term for a plurality of processing elements. For example, the processor 301 is a central processing unit (CPU), or an application-specific integrated circuit (ASIC), or is configured as one or more integrated circuits for implementing the embodiments of the present invention, for example, one or more microprocessors (DSP) or one or more field programmable gate arrays (FPGA).

The processor 301 may run or execute a software program stored in the memory 302, and invoke data stored in the memory 302, to perform various functions of the terminal device.

During specific implementation, in an embodiment, the processor 301 may include one or more CPUs, for example, a CPU 0 and a CPU 1 shown in FIG. 3.

During specific implementation, in an embodiment, the terminal device may include a plurality of processors, for example, the processor 301 and a processor 305 shown in FIG. 3. Each of the processors may be a single-core (single-CPU) processor or may be a multi-core processor. The processor herein may be one or more terminal devices, circuits, and/or processing cores configured to process data (for example, a computer program instruction).

The memory 302 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory 302 may exist independently, and is connected to the processor 301 through the communication bus 304. The memory 302 may alternatively be integrated with the processor 301.

The memory 302 is configured to store a software program for performing the solutions of the present invention, and the processor 301 controls execution of the software program.

The transceiver 303 is configured to communicate with another communication device. Certainly, the transceiver 303 may further be configured to communicate with a communication network, such as an ethernet, a radio access network (RAN), or a wireless local area network (WLAN). The transceiver 303 may include a receiving unit for implementing a receiving function and a sending unit for implementing a sending function.

The communication bus 304 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 3, but this does not mean that there is only one bus or only one type of bus.

The terminal device structure shown in FIG. 3 does not constitute a limitation on the terminal device. The terminal device may include more or fewer components than those shown in the figure, or combine some components, or have a different component arrangement.

To resolve a problem in a conventional technology that communication between terminals by using existing DCI may fail when one BWP includes a plurality of resource pools, an embodiment of this application provides a communication method, to ensure reliability of communication between terminals when a BWP includes a plurality of resource pools.

Figure 4:
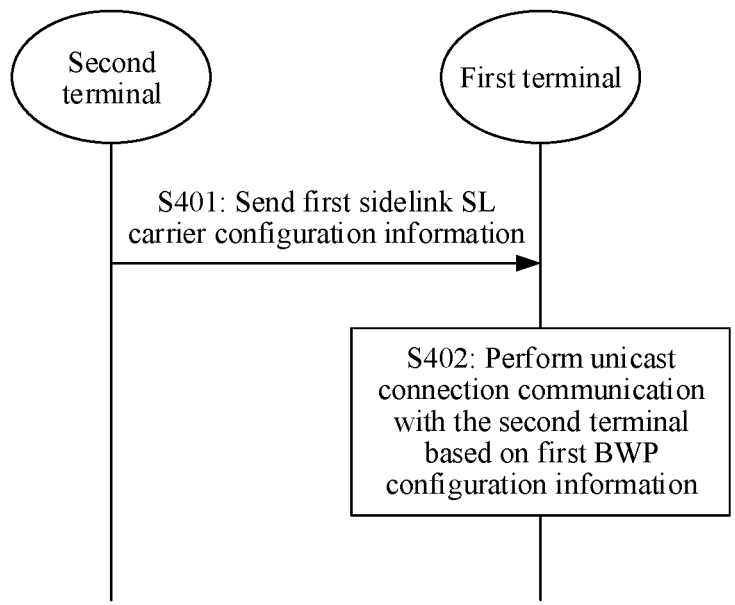
FIG. 4 is a schematic flowchart of a communication method according to an embodiment of this application.

FIG. 4 shows a communication method according to an embodiment of this application. In this embodiment, a second terminal has obtained BWP configuration information, and the communication method includes steps S401 and S402.

S401: The second terminal sends first sidelink SL carrier configuration information to a first terminal.

It may be understood that the second terminal may send first BWP configuration information through a PC5 interface or a Uu interface.

For example, a first sidelink is a wireless communication link between the first terminal and the second terminal. The first SL carrier configuration information includes the first BWP configuration information, and the first BWP configuration information includes one or more first resource pools. It should be noted that the plurality of first resource pools are a plurality of resource pools that are included in the first BWP configuration information and that have different time-frequency resources.

For example, a unicast connection exists between the first terminal and the second terminal. In step S401, the second terminal may send the first SL carrier configuration information to the first terminal through the unicast connection. For example, the first SL carrier configuration information may be sent to the first terminal by using a signaling radio bearer (Signaling Radio Bearer, SRB) corresponding to the unicast connection.

For example, the first BWP configuration information may be the BWP configuration information obtained by the second terminal. For example, the first BWP configuration information may be BWP configuration information configured by a first radio access network device for the second terminal, or may be BWP configuration information obtained by the second terminal from broadcasting by the first radio access network device or BWP configuration information obtained by the second terminal in a pre-configured manner. This is not limited in this embodiment of this application.

In an implementation, the first SL carrier configuration information is configuration information of a carrier corresponding to the unicast connection between the first terminal and the second terminal. For example, the second terminal may send, to the first terminal, configuration information of a carrier corresponding to a frequency of the unicast connection between the second terminal and the first terminal. It may be understood that the frequency may also be referred to as a carrier. It may be understood that a plurality of unicast connections may exist between the first terminal and the second terminal, and correspond to different service types. In this case, different unicast connections may correspond to different frequencies.

S402: The first terminal performs unicast connection communication with the second terminal based on the first BWP configuration information.

For example, step S402 of performing, by the first terminal, unicast connection communication with the second terminal based on the first BWP configuration information may include: obtaining, by the first terminal, an SL resource based on the first BWP configuration information and second BWP configuration information to perform the unicast connection communication. The second BWP configuration information belongs to the first SL carrier configuration information, and the second BWP configuration information includes one or more second resource pools. It should be noted that the plurality of second resource pools are a plurality of resource pools that are included in the second BWP configuration information and that have different time-frequency resources.

For example, the second BWP configuration information may be BWP configuration information obtained by the first terminal. For example, the second BWP configuration information may be BWP configuration information configured by a second radio access network device for the first terminal, or may be BWP configuration information obtained by the first terminal from broadcasting by the second radio access network device or BWP configuration information obtained by the first terminal from a pre-configured resource. This is not limited in this embodiment of this application. It should be noted that the second radio access network device connected to the first terminal and the first radio access network device connected to the second terminal may be a same radio access network device, or may be different radio access network devices. This is not limited in this embodiment of this application.

For example, when the first terminal obtains the SL resource based on the first BWP configuration information and the second BWP configuration information to perform the unicast connection communication, the SL resource may be an overlapping time-frequency resource in the first BWP configuration information and the second BWP configuration information. For example, the SL resource may be a resource having an overlapping time-frequency domain position in a sending resource pool in the second BWP configuration information and a receiving resource pool in the first BWP configuration information, and is used as an SL resource for the unicast connection communication; and/or the SL resource may be a resource having an overlapping time-frequency domain position in a sending resource pool in the first BWP configuration information and a receiving resource pool in the second BWP configuration information, and is used as an SL resource for the unicast connection communication. Therefore, when the first terminal communicates with the second terminal on the SL resource, a sending resource pool used by the first terminal to send data belongs to a receiving resource pool used by the second terminal to receive data, and/or a sending resource pool used by the second terminal to send data belongs to a receiving resource pool used by the first terminal to receive data. Therefore, reliability of communication between the first terminal and the second terminal in the unicast connection can be ensured.

(Optionally) The performing, by the first terminal, unicast connection communication with the second terminal based on the first BWP configuration information may include: obtaining, by the first terminal, a target resource pool based on the first BWP configuration information and second BWP configuration information, where the target resource pool is used by the first terminal to perform the unicast connection communication with the second terminal. The first terminal performs the unicast connection communication with the second terminal based on the target resource pool. The SL resource is an SL resource in the target resource pool.

(Optionally) The first terminal may determine, based on the first BWP configuration information and the second BWP configuration information, a resource pool including a same time-frequency resource in the first resource pool and the second resource pool as the target resource pool. That is, the target resource pool belongs to both the first BWP configuration information and the second BWP configuration information. Alternatively, it may be understood that the target resource pool belongs to both the first resource pool and the second resource pool. The target resource pool may be understood as an intersection set of the first BWP configuration information and the second BWP configuration information. Alternatively, the target resource pool may be understood as an intersection set of the first resource pool and the second resource pool. It may be understood that the first resource pool may be a sending resource pool and the second resource pool may be a receiving resource pool, or the first resource pool may be a receiving resource pool and the second resource pool may be a sending resource pool. The target resource pool may be one or more resource pools in one BWP. This is not limited in this embodiment of this application.

For example, if the sending resource pool and the receiving resource pool are separately configured, the first terminal may determine, as the target resource pool based on the first BWP configuration information and the second BWP configuration information, the resource having the overlapping time-frequency domain position or a resource pool including the resource having the overlapping time-frequency domain position in the receiving resource pool in the first BWP configuration information and the sending resource pool in the second BWP configuration information; and/or determine, as the target resource pool based on the first BWP configuration information and the second BWP configuration information, the resource having the overlapping time-frequency domain position or the resource pool including the resource having the overlapping time-frequency domain position in the sending resource pool in the first BWP configuration information and the receiving resource pool in the second BWP configuration information. Therefore, the sending resource pool used by the first terminal to send data belongs to the receiving resource pool used by the second terminal to receive data, and/or the sending resource pool used by the second terminal to send data belongs to the receiving resource pool used by the first terminal to receive data.

For example, this embodiment is applicable to a scenario in which the first terminal is in an idle mode or a connected mode. In NR V2X, the first terminal may obtain a resource in a mode 1 or a mode 2. If the first terminal uses the mode 1, the first terminal may perform scheduling based on the first BWP configuration information sent by the second terminal and the second BWP configuration information obtained by the first terminal. If the first terminal uses the mode 2, the first terminal may select the resource based on the first BWP configuration information sent by the second terminal and the second BWP configuration information obtained by the first terminal.

Figure 5:
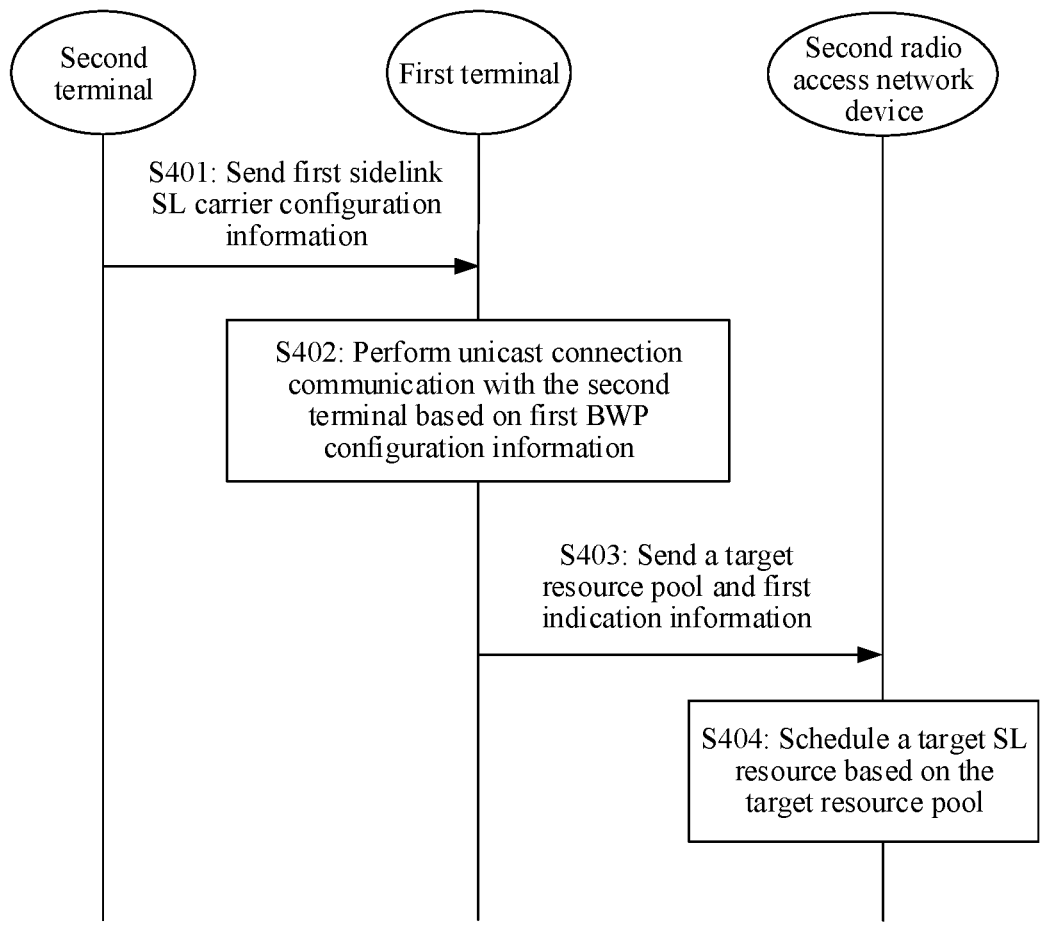
FIG. 5 is another schematic flowchart of a communication method according to an embodiment of this application.

As shown in FIG. 5, if the first terminal uses the mode 1, steps S403 and S404 may further be included after steps S401 and S402.

S403: The first terminal sends the target resource pool and first indication information to the second radio access network device.

The first indication information is used to indicate the unicast connection between the first terminal and the second terminal. For example, the first indication information may be a destination identifier Destination ID of the unicast connection, and optionally, may further include a source identifier Source ID of the unicast connection. The destination identifier is an identifier that is allocated by the second terminal for the unicast connection and that is received by the first terminal from the second terminal, and the source identifier is an identifier allocated by the first terminal for the unicast connection.

It may be understood that the first terminal sends the target resource pool and the first indication information to the second radio access network device, so that when the second radio access network device schedules a resource for the unicast connection between the first terminal and the second terminal, the target resource pool may be used as a limitation on scheduling performed by the second radio access network device.

S404: The second radio access network device schedules a target SL resource based on the target resource pool.

The target SL resource is a time-frequency resource in the target resource pool.

It may be understood that because the target resource pool is the intersection set of the first resource pool and the second resource pool, the radio access network device may perform scheduling based on the target resource pool during scheduling. For example, a resource scheduled by the radio access network device needs to be limited to a time-frequency domain range of the target resource pool. In this way, when the first terminal performs the unicast connection communication with the second terminal, it can be ensured that the sending resource pool used by the first terminal to send data belongs to the receiving resource pool used by the second terminal to receive data. Therefore, the reliability of the communication between the first terminal and the second terminal in the unicast connection can be ensured.

Figure 6:
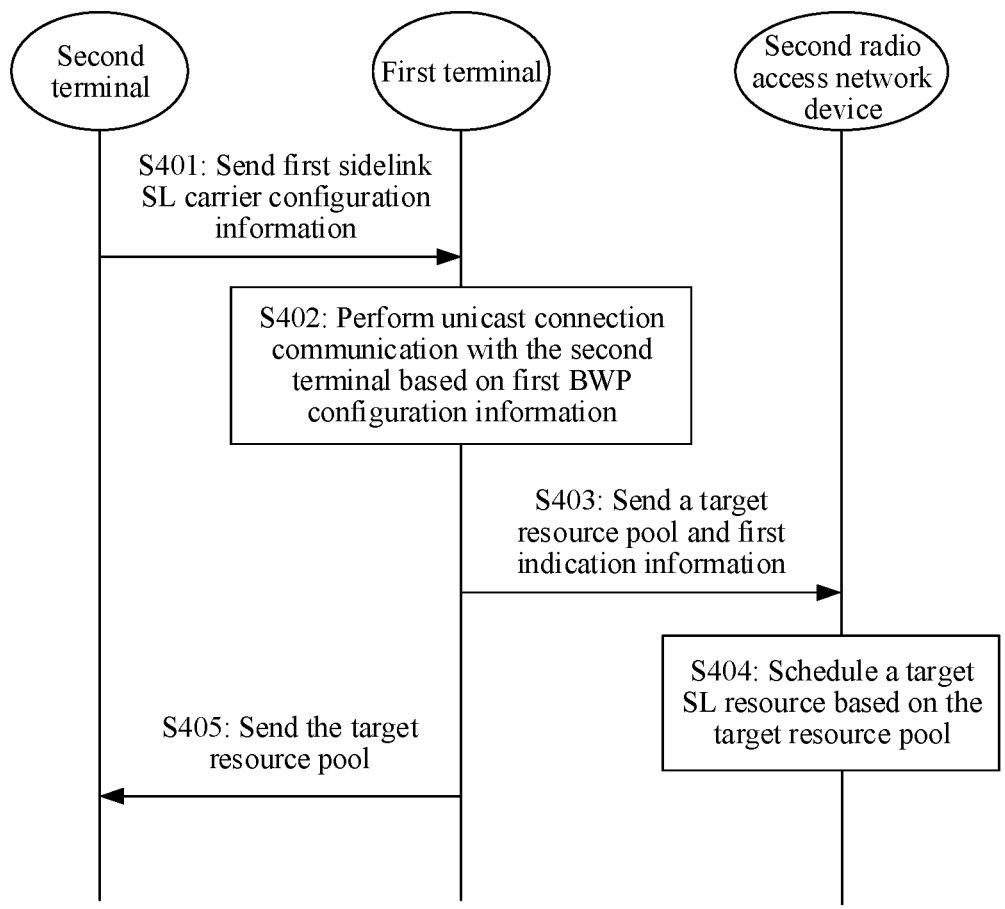
FIG. 6 is another schematic flowchart of a communication method according to an embodiment of this application.

As shown in FIG. 6, the method may further include step S405.

S405: The first terminal sends the target resource pool to the second terminal.

For example, the first terminal may send the target resource pool to the second terminal, so that the second terminal performs the unicast connection communication with the first terminal based on the target resource pool.

It may be understood that the target resource pool is an intersection set of the receiving resource pool used by the first terminal to receive data and the sending resource pool used by the second terminal to send data, so that the second terminal performs the unicast connection communication with the first terminal based on the target resource pool. Therefore, it can be ensured that the sending resource pool used by the second terminal to send data belongs to the receiving resource pool used by the first terminal to receive data; that is, the first terminal can receive data sent by the second terminal, thereby ensuring the reliability of the unicast connection communication between the first terminal and the second terminal.

(Optionally) The target resource pool may alternatively be an intersection set of the sending resource pool used by the first terminal to send data and the receiving resource pool used by the second terminal to receive data, so that the sending resource pool used by the first terminal to send data belongs to the receiving resource pool used by the second terminal to receive data; that is, the second terminal can also receive data sent by the first terminal. This ensures the reliability of the unicast connection communication between the first terminal and the second terminal.

It should be noted that a sequence of step S403 and step S405 is not limited in this embodiment of this application.

According to the communication method provided in this embodiment of this application, the second terminal sends the first sidelink SL carrier configuration information to the first terminal, the first terminal performs the unicast connection communication with the second terminal based on the first BWP configuration information, the first terminal sends the target resource pool and the first indication information to the second radio access network device, and the radio access network device selects, based on the target resource pool, the target SL resource for scheduling. In this embodiment, when the first terminal performs the unicast connection communication with the second terminal based on the first BWP configuration information of the second terminal, because the sending resource pool used by the first terminal to send data belongs to the receiving resource pool used by the second terminal to receive data, and the sending resource pool used by the second terminal to send data belongs to the receiving resource pool used by the first terminal to receive data, the reliability of the unicast connection communication between the first terminal and the second terminal is ensured.

Figure 7:
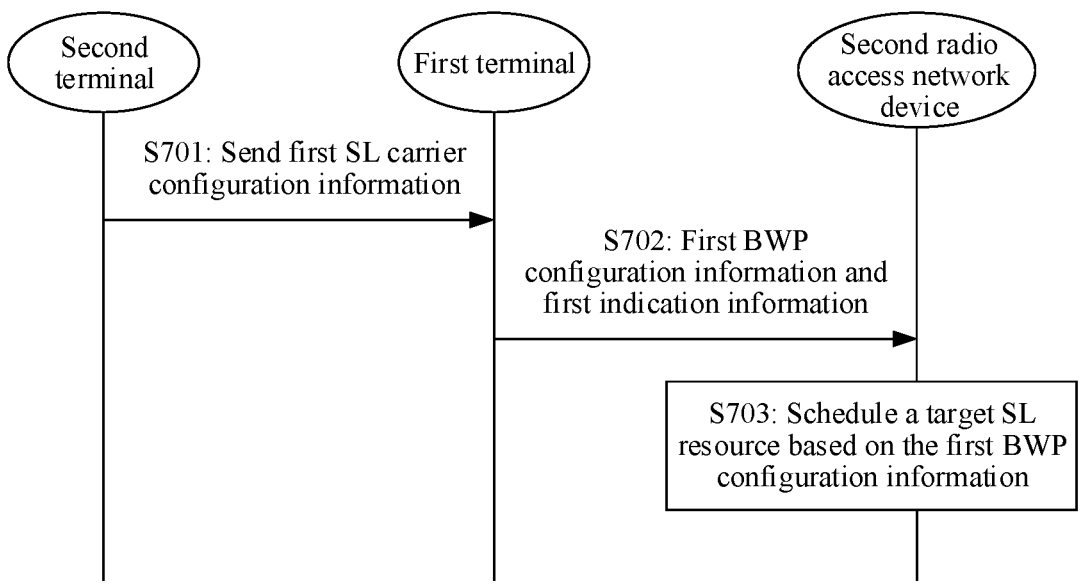
FIG. 7 is another schematic flowchart of a communication method according to an embodiment of this application.

FIG. 7 shows another communication method according to an embodiment of this application. If a first terminal has obtained the foregoing second BWP configuration information, the communication method includes steps S701 to S703.

S701: A second terminal sends first SL carrier configuration information to the first terminal.

It may be understood that a specific implementation of step S701 in which the second terminal sends the first SL carrier configuration information to the first terminal is the same as an implementation of step S401 in which the second terminal sends the first sidelink SL carrier configuration information to the first terminal. For details, refer to the descriptions in step S401. Details are not described herein again.

S702: The first terminal sends first BWP configuration information and first indication information to a second radio access network device.

The first indication information is used to indicate a unicast connection between the first terminal and the second terminal.

S703: The second radio access network device schedules a target SL resource based on the first BWP configuration information.

For example, step S703 may include: scheduling, by the second radio access network device, the target SL resource based on the first BWP configuration information and the second BWP configuration information.

(Optionally) The second radio access network device may obtain an intersection set of the first BWP configuration information and the second BWP configuration information, and select the target SL resource from resource(s) in the intersection set. That is, the target SL resource is the resource in the first BWP configuration information and is also the resource in the second BWP configuration information. For example, when determining the target SL resource in a sending resource pool in the second BWP configuration information of the first terminal, the second radio access network device needs to consider a range of a receiving resource pool in the first BWP configuration information. That is, it needs to be ensured that the target SL resource scheduled by the second radio access network device for the first terminal can be received by the second terminal.

(Optionally) The second radio access network device may obtain a target resource pool based on the first BWP configuration information and the second BWP configuration information, and select the target SL resource from the target resource pool. That is, the target SL resource is a time-frequency resource in the target resource pool. The target resource pool is used by the first terminal to perform unicast connection communication with the second terminal. Specifically, a sending resource in the target resource pool may be used by the first terminal to send data and/or signaling of the unicast connection to the second terminal. A receiving resource in the target resource pool may be used by the first terminal to receive the data and/or signaling, of the unicast connection, sent by the second terminal. For a specific method for obtaining the target resource pool, refer to the descriptions in step S402. Details are not described herein again.

It may be understood that, because the target SL resource is the resource in the first BWP configuration information and is also the resource in the second BWP configuration information, when the first terminal performs the unicast connection communication with the second terminal on the target SL resource, the sending resource pool used by the first terminal to send data needs to belong to the receiving resource pool used by the second terminal to receive data. Therefore, reliability of the unicast connection communication between the first terminal and the second terminal is ensured.

According to the communication method provided in this embodiment of this application, the second terminal sends the first sidelink SL carrier configuration information to the first terminal, the first terminal sends the first BWP configuration information and the first indication information to the second radio access network device, and the second radio access network device selects, based on the first BWP configuration information, the target SL resource for scheduling. In this embodiment, the target SL resource scheduled by the second radio access network device is the resource in the first BWP configuration information and is also the resource in the second BWP configuration information. Therefore, the reliability of the unicast connection communication between the first terminal and the second terminal can be ensured.

Figure 8:
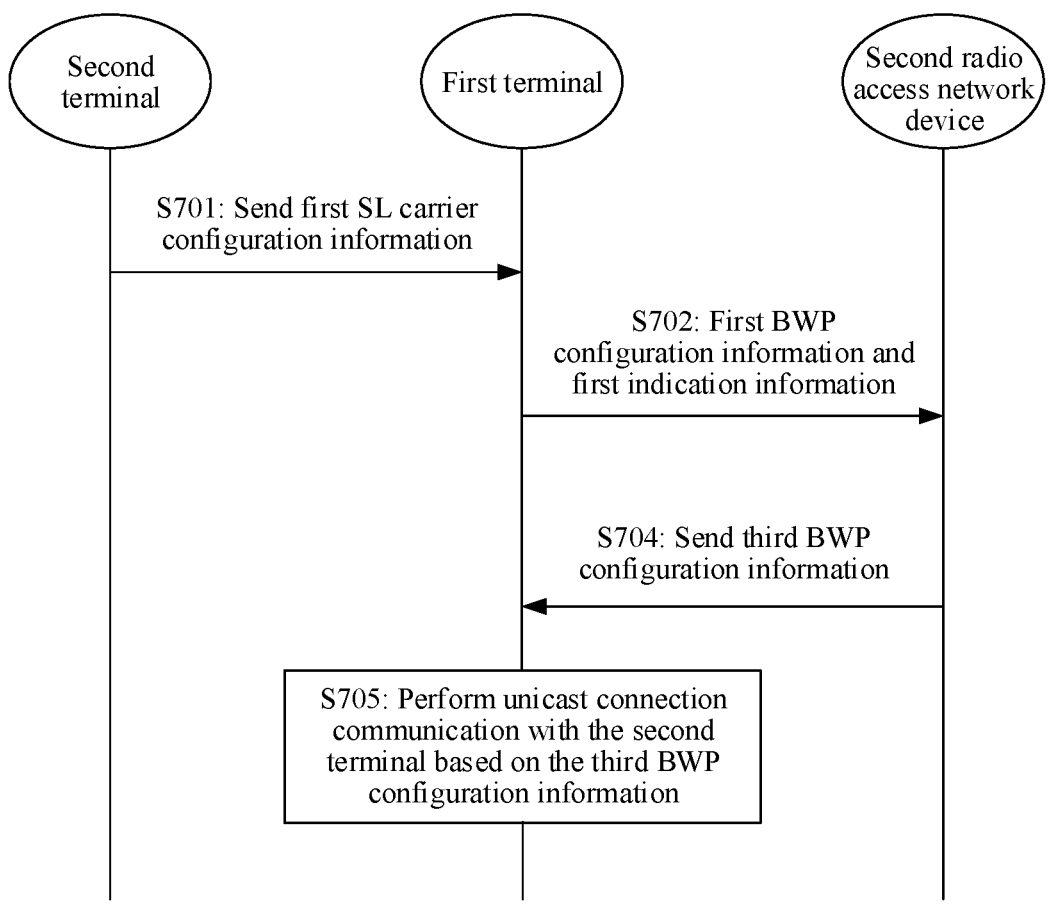
FIG. 8 is another schematic flowchart of a communication method according to an embodiment of this application.

FIG. 8 shows still another communication method according to an embodiment of this application. If the first terminal does not obtain the foregoing second BWP configuration information, that is, the first terminal does not store the BWP configuration information, after steps S701 and S702, the method may further include steps S704 and S705.

S704: The second radio access network device sends third BWP configuration information to the first terminal.

The third BWP configuration information and the first BWP configuration information correspond to a same SL carrier.

For example, the third BWP configuration information is configured by the second radio access network device for the first terminal after the second radio access network device considers the first BWP configuration information of the second terminal. That is, the third BWP configuration information belongs to the first SL carrier configuration information.

It may be understood that because the second radio access network device receives the first BWP configuration information of the second terminal, the second radio access network device may schedule a target SL resource based on the first BWP configuration information of the second terminal, or based on the first BWP configuration information of the second terminal and the third BWP configuration information of the first terminal, where the target SL resource falls within a time-frequency domain range of a target resource pool. Therefore, when the first terminal performs the unicast connection communication with the second terminal, it can be ensured that the target resource pool used by the first terminal to send data belongs to a receiving resource pool used by the second terminal to receive data. Therefore, reliability of the communication between the first terminal and the second terminal in the unicast connection can be ensured.

S705: The first terminal performs the unicast connection communication with the second terminal based on the third BWP configuration information.

For example, the performing, by the first terminal, the unicast connection communication with the second terminal based on the third BWP configuration information includes: obtaining, by the first terminal, an SL resource based on the first BWP configuration information and the third BWP configuration information to perform the unicast connection communication. The third BWP configuration information includes one or more third resource pools.

For example, when the first terminal obtains the SL resource based on the first BWP configuration information and the third BWP configuration information to perform the unicast connection communication, the SL resource may be an overlapping time-frequency resource in the first BWP configuration information and the third BWP configuration information. For example, the SL resource may be a resource having an overlapping time-frequency domain position in a sending resource pool in the third BWP configuration information and a receiving resource pool in the first BWP configuration information, and is used as an SL resource for the unicast connection communication; and/or the SL resource may be a resource having an overlapping time-frequency domain position in a sending resource pool in the first BWP configuration information and a receiving resource pool in the third BWP configuration information, and is used as an SL resource for the unicast connection communication. Therefore, when the first terminal communicates with the second terminal on the SL resource, a sending resource pool used by the first terminal to send data belongs to a receiving resource pool used by the second terminal to receive data, and/or a sending resource pool used by the second terminal to send data belongs to a receiving resource pool used by the first terminal to receive data. Therefore, the reliability of the communication between the first terminal and the second terminal in the unicast connection can be ensured.

(Optionally) The performing, by the first terminal, the unicast connection communication with the second terminal based on the third BWP configuration information comprises: obtaining, by the first terminal, the target resource pool based on the first BWP configuration information and the third BWP configuration information, where the target resource pool is used by the first terminal to perform the unicast connection communication with the second terminal. The first terminal performs the unicast connection communication with the second terminal based on the target resource pool. The SL resource is an SL resource in the target resource pool.

(Optionally) The first terminal may determine, based on the first BWP configuration information and the third BWP configuration information, a resource pool including a same time-frequency resource in one or more first resource pools and one or more third resource pools as the target resource pool. That is, the target resource pool belongs to both the first resource pool and the third resource pool. The target resource pool may be understood as an intersection set of the first resource pool and the third resource pool. Therefore, the sending resource pool used by the first terminal to send data belongs to the receiving resource pool used by the second terminal to receive data. It may be understood that the first resource pool may be a sending resource pool and the second resource pool may be a receiving resource pool, or the first resource pool may be a receiving resource pool and the second resource pool may be a sending resource pool. The target resource pool may be one or more resource pools in one BWP. This is not limited in this embodiment of this application.

For example, if the sending resource pool and the receiving resource pool are separately configured, the first terminal may determine, as the target resource pool based on the first BWP configuration information and the third BWP configuration information, a resource pool including a same time-frequency resource in the receiving resource pool in the first BWP configuration information and the sending resource pool in the third BWP configuration information; and/or determine, as the target resource pool based on the first BWP configuration information and the third BWP configuration information, a resource pool including a same time-frequency resource in the sending resource pool in the first BWP configuration information and the receiving resource pool in the third BWP configuration information. Therefore, the sending resource pool used by the first terminal to send data belongs to the receiving resource pool used by the second terminal to receive data, and/or the sending resource pool used by the second terminal to send data belongs to the receiving resource pool used by the first terminal to receive data.

For example, this embodiment is applicable to a scenario in which the first terminal is in a connected mode. In NR V2X, the first terminal may obtain a resource in a mode 1 or a mode 2. If the first terminal uses the mode 1, the first terminal may perform scheduling based on the first BWP configuration information sent by the second terminal and the third BWP configuration information received by the first terminal. If the first terminal uses the mode 2, the first terminal may select the resource based on the first BWP configuration information sent by the second terminal and the third BWP configuration information received by the first terminal.

According to the communication method provided in this embodiment of this application, the second terminal sends the first SL carrier configuration information to the first terminal, the first terminal sends the first BWP configuration information and the first indication information to the second radio access network device, the second radio access network device sends the third BWP configuration information to the first terminal, and the first terminal performs the unicast connection communication with the second terminal based on the third BWP configuration information. In this embodiment, the second radio access network device sends, to the first terminal, the third BWP configuration information corresponding to the same SL carrier as the first BWP configuration information, and then performs the unicast connection communication with the second terminal based on the third BWP configuration information, so that the sending resource pool used by the first terminal to send data may belong to the receiving resource pool used by the second terminal to receive data, and/or the sending resource pool used by the second terminal to send data may belong to the receiving resource pool used by the first terminal to receive data. Therefore, the reliability of the unicast connection communication between the first terminal and the second terminal can be ensured.

Figure 9:
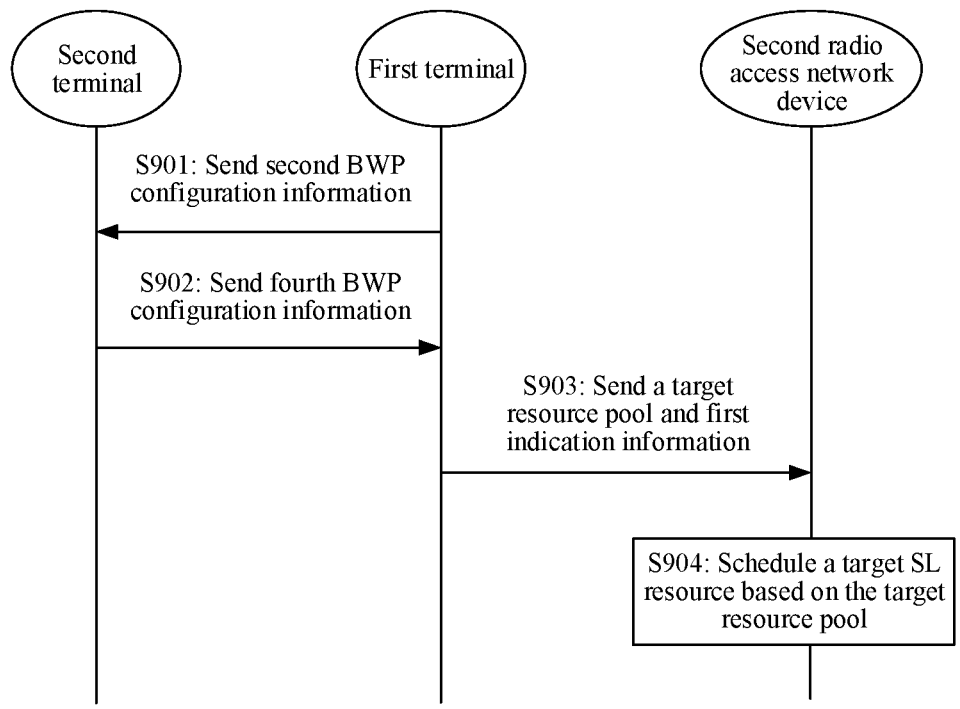
FIG. 9 is another schematic flowchart of a communication method according to an embodiment of this application.

FIG. 9 shows still another communication method according to an embodiment of this application. The communication method includes steps S901 to S904.

S901: A first terminal sends second BWP configuration information to a second terminal.

The second BWP configuration information belongs to first sidelink SL carrier configuration information, and a first sidelink is a wireless communication link between the first terminal and the second terminal. The second BWP configuration information includes one or more second resource pools.

For example, the second BWP configuration information may be BWP configuration information configured by a second radio access network device for the first terminal, or may be BWP configuration information obtained by the first terminal from broadcasting by the second radio access network device or BWP configuration information obtained by the first terminal from a pre-configured resource. This is not limited in this embodiment of this application.

S902: The second terminal sends fourth BWP configuration information to the first terminal.

The fourth BWP configuration information and the second BWP configuration information correspond to a same SL carrier. The fourth BWP configuration information belongs to the first SL carrier configuration information. The fourth BWP configuration information includes one or more target resource pools, and the target resource pool is used by the first terminal to perform unicast connection communication with the second terminal.

It may be understood that in this embodiment, the second terminal may determine the target resource pool based on the second BWP configuration information sent by the first terminal and first BWP configuration information obtained by the second terminal, and send the fourth BWP configuration information including the target resource pool to the first terminal. A specific manner in which the second terminal determines the target resource pool is the same as a manner in which the first terminal determines the target resource pool in step S402. For details, refer to the descriptions in step S402. Details are not described herein again. Different from the foregoing embodiment, in this embodiment, the second terminal may send, to the first terminal, the fourth BWP configuration information that includes the target resource pool and that is determined by the second terminal.

S903: The first terminal sends the target resource pool and first indication information to the second radio access network device.

It may be understood that a specific implementation of step S903 is the same as a specific implementation of step S403 in which the first terminal sends the target resource pool and the first indication information to the second radio access network device. For details, refer to the descriptions in step S403. Details are not described herein again.

S904: The second radio access network device schedules a target SL resource based on the target resource pool.

It may be understood that a specific implementation of step S904 is the same as a specific implementation of step S404 in which the second radio access network device schedules the target SL resource based on the target resource pool. For details, refer to the descriptions in step S404. Details are not described herein again.

In this embodiment, the fourth BWP configuration information sent by the second terminal is BWP configuration information determined by the second terminal after the second terminal considers the first BWP configuration information obtained by the second terminal and the second BWP configuration information obtained by the first terminal. That is, the fourth BWP configuration information includes one or more target resource pools used by the first terminal to perform the unicast connection communication with the second terminal. Therefore, after the fourth BWP configuration information including the target resource pool is sent to the second radio access network device, the fourth BWP configuration information may be used as a limitation on scheduling a resource by the second radio access network device, to ensure reliability of the communication between the first terminal and the second terminal.

This embodiment of this application provides the communication method. The first terminal sends the second BWP configuration information to the second terminal, the second terminal sends the fourth BWP configuration information to the first terminal, the first terminal sends the target resource pool and the first indication information to the second radio access network device, and the second radio access network device selects, based on the target resource pool, the target SL resource for scheduling. In this embodiment, the second terminal sends the fourth BWP configuration information including the target resource pool to the first terminal, and the second terminal sends the target resource pool to the radio access network device, so that during resource scheduling, the second radio access network device may select the target SL resource for scheduling from the target resource pool. Therefore, a sending resource pool used by the first terminal to send data belongs to a receiving resource pool used by the second terminal to receive data, and/or a sending resource pool used by the second terminal to send data belongs to a receiving resource pool used by the first terminal to receive data. Therefore, the reliability of the unicast connection communication between the first terminal and the second terminal can be ensured.

Figure 10:
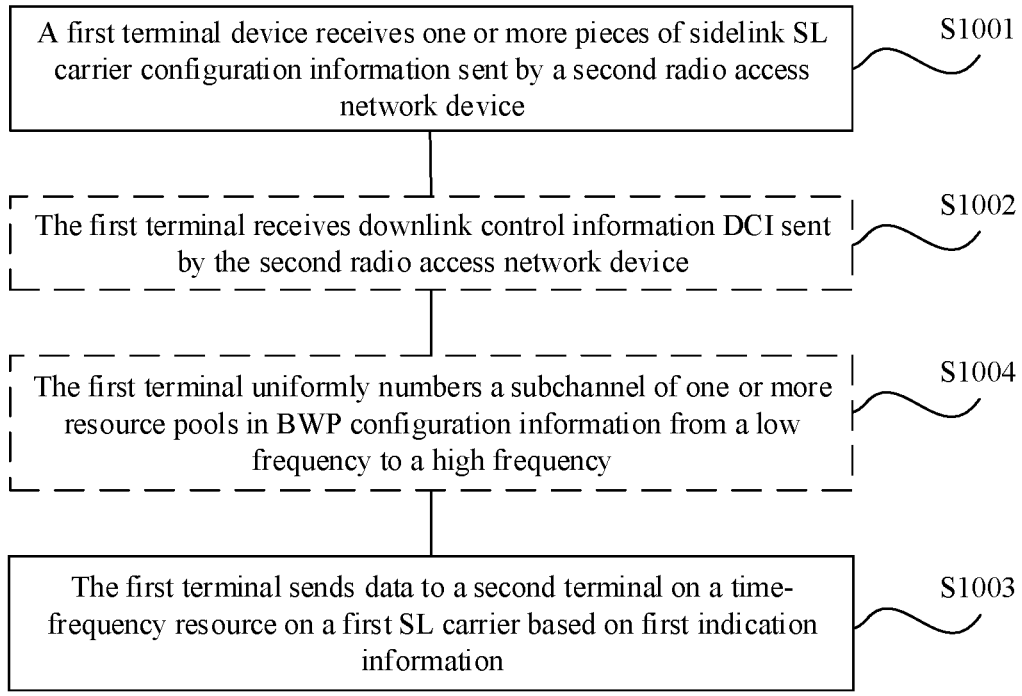
FIG. 10 is another schematic flowchart of a communication method according to an embodiment of this application.

FIG. 10 shows still another communication method according to an embodiment of this application. Based on the foregoing embodiment, if a radio access network device schedules or configures a plurality of resource pools, the foregoing method further includes steps S1001 to S1004.

S1001: The first terminal device receives one or more pieces of sidelink SL carrier configuration information sent by the second radio access network device.

The SL carrier configuration information includes BWP configuration information, and the BWP configuration information includes one or more resource pools. One resource pool may include one or more subchannels, and quantities of subchannels included in different resource pools in one BWP may be the same or different. This is not limited in this embodiment of this application.

S1002: The first terminal receives downlink control information DCI sent by the second radio access network device.

The DCI includes first indication information, the first indication information is used to indicate a time-frequency resource on a first SL carrier in one or more SL carriers, and the first SL carrier is an SL carrier scheduled by the second radio access network device.

The time-frequency resource on the first SL carrier includes a time-frequency resource of one or more resource pools in one BWP. That is, a time-frequency resource scheduled by the radio access network device may relate to a plurality of resource pools.

For example, the first indication information includes second indication information and third indication information, the second indication information is used to indicate the first SL carrier, and the third indication information includes a minimum index of a subchannel scheduled by the radio access network device. That is, the second indication information indicates the SL carrier scheduled by the radio access network device, and the third indication information is used to indicate the subchannel that has the minimum index and that is occupied by the time-frequency resource on the first SL carrier.

S1003: The first terminal sends data to the second terminal on the time-frequency resource on the first SL carrier based on the first indication information.

In an implementation, a configured subchannel of the first terminal is independently numbered in the resource pool. In this implementation, the first indication information further includes fourth indication information, and the fourth indication information is used to indicate the resource pool scheduled by the radio access network device.

In this implementation, step S1003 of sending data to the second terminal on the time-frequency resource on the first SL carrier based on the first indication information may include: determining, based on the second indication information, the third indication information, and the fourth indication information that are included in the first indication information, the subchannel scheduled by the radio access network device, and sending the data to the second terminal on the subchannel scheduled by the radio access network device. For example, in this implementation, the subchannel is independently numbered in the resource pool, that is, numbers of subchannels in different resource pools may be duplicate. Therefore, the first SL carrier scheduled by the radio access network device may be first determined based on the second indication information, then the resource pool scheduled by the radio access network device is determined based on the fourth indication information, and then the minimum index of the subchannel scheduled by the radio access network device is determined based on the third indication information, so that a specific position of the time-frequency resource scheduled by the radio access network device is determined, and the data is sent to the second terminal on the time-frequency resource.

(Optionally) In another implementation, before step S1003, the method further includes step S1004.

S1004: The first terminal uniformly numbers a subchannel of the one or more resource pools in the BWP configuration information from a low frequency to a high frequency.

Figure 11:
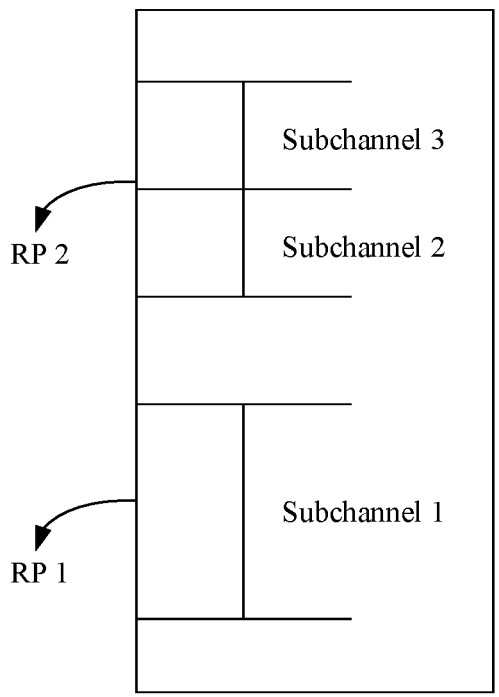
FIG. 11 is a schematic diagram of a resource pool configuration according to an embodiment of this application.

For example, as shown in FIG. 11, if the BWP configuration information includes two resource pools (RP), which are respectively denoted as an RP 1 and an RP 2, where the RP 1 includes one sub-channel, and the RP 2 includes two sub-channels, the UE may uniformly number the three subchannels in one BWP from a low frequency to a high frequency across the resource pools. As shown in FIG. 11, the three subchannels are respectively a subchannel 1, a subchannel 2, and a subchannel 3.

In this implementation, the sending, by the first terminal, data to the second terminal on the time-frequency resource on the first SL carrier based on the first indication information may include: determining, based on the second indication information and the third indication information that are included in the first indication information, the subchannel scheduled by the radio access network device, and sending the data to the second terminal on the subchannel scheduled by the radio access network device. For example, in this implementation, the subchannels are uniformly numbered across the resource pools, that is, the subchannels in different resource pools are uniformly numbered. Therefore, the first SL carrier scheduled by the radio access network device may be first determined based on the second indication information, and then the minimum index of the subchannel scheduled by the radio access network device is determined based on the third indication information, so that a specific position of the time-frequency resource scheduled by the radio access network device is determined, and the data is sent to the second terminal on the time-frequency resource.

According to the communication method provided in this embodiment of this application, the first terminal device receives the one or more pieces of sidelink SL carrier configuration information sent by the second radio access network device, the first terminal receives the downlink control information DCI sent by the second radio access network device, and the first terminal sends the data to the second terminal on the time-frequency resource on the first SL carrier based on the first indication information. In this embodiment, when one BWP includes a plurality of resource pools, a specific time-frequency resource position can be accurately indicated to UE.

Figure 12:
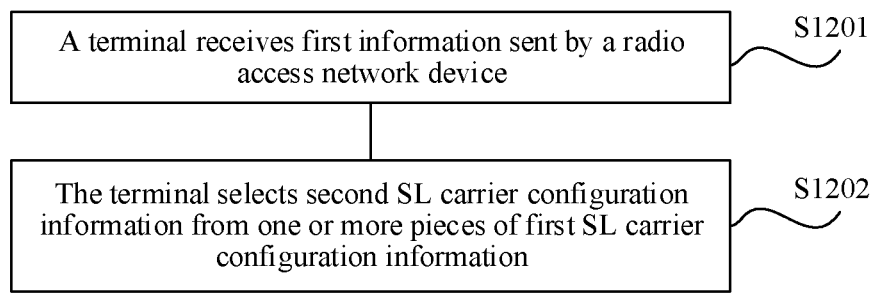
FIG. 12 is another schematic flowchart of a communication method according to an embodiment of this application.

FIG. 12 shows still another communication method according to an embodiment of this application. The method further includes steps S1201 and S1202.

S1201: A terminal receives first information sent by a radio access network device.

The first information includes one or more pieces of first SL carrier configuration information. The first SL carrier configuration information includes first BWP configuration information, and the first BWP configuration information includes one or more first resource pools.

The terminal is in an idle (IDLE) mode or in an inactive (INACTIVE) mode, and the first information may be carried in a broadcast message of the radio access network device. For example, the radio access network device may broadcast the first SL carrier configuration information to one or more terminals by using the broadcast message. However, because different terminals may have different capabilities and subscribed services or interested services, the broadcast first SL carrier configuration information may not be applicable to each terminal.

S1202: The terminal selects second SL carrier configuration information from the one or more pieces of first SL carrier configuration information.

A second SL carrier is one or more carriers in a first SL carrier. The second SL carrier configuration information includes second BWP configuration information, the second BWP configuration information includes one or more second resource pools, and the second resource pool is a resource pool in the first resource pool.

For example, the terminal may select, from the one or more pieces of first SL carrier configuration information, at least one frequency corresponding to a service to which the terminal is interested, to determine the second SL carrier configuration information.

For example, the terminal may select, based on a radio frequency capability of the terminal, the second SL carrier configuration information that does not exceed (less than or equal to) a maximum bandwidth supported by the terminal.

For example, the first information may further include a channel busy ratio (CBR) threshold. The CBR threshold may not be distinguished by using frequencies, or each frequency may correspond to one CBR threshold. In this case, the terminal may select, based on the CBR threshold, a resource pool whose measurement result is greater than or equal to the threshold as the second resource pool.

For example, the first information may further include a service priority corresponding to the first SL carrier, and the service priority may be obtained by the radio access network device from a V2X control function CF unit of a core network device. Alternatively, the terminal may determine a service priority based on quality of service (QoS) of a service. In this case, when a capability of UE is insufficient to cover resource pools corresponding to all interested frequencies, a frequency corresponding to a service having a higher service priority may be preferentially selected.

For example, when selecting a resource pool, the terminal may preferentially select a preconfigured resource pool for communication.

A specific method for determining, by the terminal, the second SL carrier configuration information from the one or more pieces of first SL carrier configuration information is not limited in this embodiment of this application. The foregoing is merely an example for description.

It may be understood that, in this embodiment, the terminal may further select, based on BWP configurations broadcast by the radio access network device and various factors, a BWP configuration broadcast by the radio access network device, to determine a BWP actually used by the terminal, thereby ensuring reliability of service transmission.

According to the communication method provided in this embodiment, the terminal receives the first information sent by the radio access network device. The terminal determines the second SL carrier configuration information from the one or more pieces of first SL carrier configuration information based on a preset condition. In this embodiment, the BWP actually used by the terminal can be selected from the BWP configurations broadcast by the radio access network device, thereby ensuring the reliability of the service transmission.

The foregoing describes, mainly from the perspective of method steps, the solutions provided in the embodiments of this application. It may be understood that, to implement the foregoing functions, a computer includes corresponding hardware structures and/or software modules for performing the functions. A person skilled in the art should be easily aware that, in combination with modules and algorithm steps of the examples described in the embodiments disclosed in this specification, this application may be implemented by a combination of hardware and computer software. A person skilled in the art may use different methods to implement the described functions for each particular application, but it should not be considered that the implementation goes beyond the scope of this application.

In the embodiments of this application, the computer may be divided into function modules based on the foregoing method examples. For example, function modules may be obtained through division based on corresponding functions, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, another division manner may be used.

Figure 13:
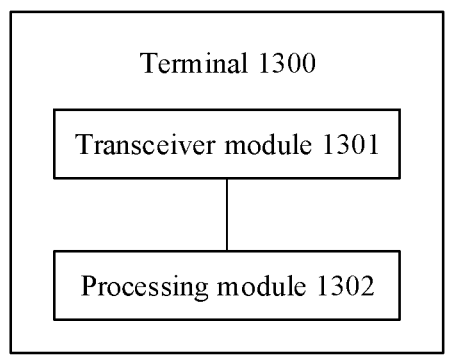
FIG. 13 is a schematic composition diagram of a terminal according to an embodiment of this application.

When each function module is obtained through division corresponding to each function, FIG. 13 is a possible schematic structural diagram of a terminal in the foregoing embodiment. The terminal 1300 includes a transceiver module 1301 and a processing module 1302. The transceiver module 1301 may be configured to support the terminal 1300 in performing S403 in FIG. 5, S405 in FIG. 6, S702 in FIGS. 7, S901 and S903 in FIGS. 9, S1001 and S1002 in FIG. 10, or S1201 in FIG. 12. The processing module 1302 may be configured to support the terminal 1300 in performing S402 in FIG. 4, S402 in FIGS. 5, S1003 and S1004 in FIG. 10, or S1202 in FIG. 12. It may be understood that the transceiver module 1301 is further configured to send and receive information, or is configured to communicate with another network element (for example, another terminal or a radio access network device), and/or is configured to perform another process of the technology described in this specification. All related content of the steps in the foregoing method embodiment may be cited in function descriptions of the corresponding function modules. Details are not described herein again.

Figure 14:
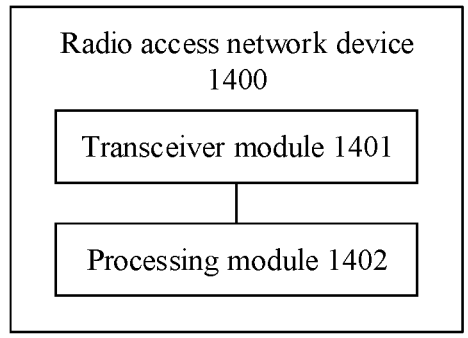
FIG. 14 is a schematic composition diagram of a radio access network device according to an embodiment of this application.

When each function module is obtained through division corresponding to each function, FIG. 14 is a possible schematic structural diagram of a radio access network device in the foregoing embodiment. The radio access network device 1400 includes a transceiver module 1401 and a processing module 1402. The transceiver module 1401 may be configured to support the radio access network device 1400 in performing S704 in FIG. 8. The processing module 1402 may be configured to support the radio access network device 1400 in performing S404 in FIG. 5, S703 in FIG. 7, or S904 in FIG. 9. It may be understood that the transceiver module 1401 is further configured to send and receive information, or is configured to communicate with another network element (for example, a terminal), and/or is configured to perform another process of the technology described in this specification. All related content of the steps in the foregoing method embodiment may be cited in function descriptions of the corresponding function modules. Details are not described herein again.

Figure 15:
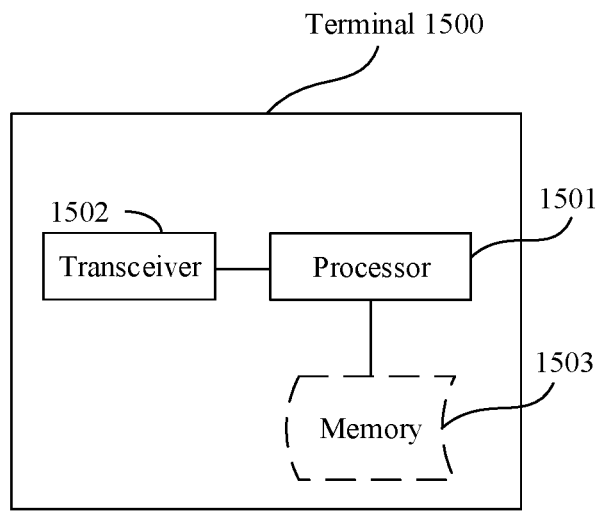
FIG. 15 is another schematic composition diagram of a terminal according to an embodiment of this application.

When an integrated unit is used, FIG. 15 is a possible schematic structural diagram of a terminal 1500 in the foregoing embodiment. The terminal 1500 includes a processor 1501 and a transceiver 1502. The processor 1501 is configured to control and manage an action of the terminal 1500. For example, the processor 1501 is configured to support the terminal 1500 in performing S402 in FIG. 4, S402 in FIGS. 5, S1003 and S1004 in FIG. 10, S1202 in FIG. 12, and/or another process of the technology described in this specification. The transceiver 1502 is configured to support the terminal 1500 in performing S403 in FIG. 5, S405 in FIG. 6, S702 in FIGS. 7, S901 and S903 in FIGS. 9, S1001 and S1002 in FIG. 10, or S1201 in FIG. 12. The transceiver 1502 is further configured to send and receive information, or is configured to communicate with another network element (for example, a terminal), and/or is configured to perform another process of the technology described in this specification. Optionally, the terminal 1500 may further include a memory 1503, and the memory 1503 is configured to store program code and data that correspond to any one of the foregoing communication methods performed by the terminal 1500. The memory 1503 may be a read-only memory (ROM), another type of static storage device capable of storing static information and instructions, a random access memory (RAM), or the like. The terminal 1500 may be the terminal device shown in FIG. 3. For descriptions of all related content of the components in FIG. 3, refer to the function descriptions of corresponding components in FIG. 15. Details are not described herein again.

Figure 16:
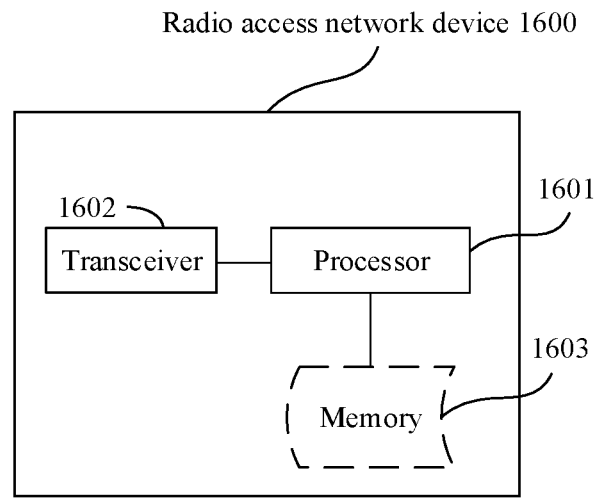
FIG. 16 is another schematic composition diagram of a radio access network device according to an embodiment of this application.

When an integrated unit is used, FIG. 16 is a possible schematic structural diagram of a radio access network device 1600 in the foregoing embodiment. The radio access network device 1600 includes a processor 1601 and a transceiver 1602. The processor 1601 is configured to control and manage an action of the radio access network device 1600. For example, the processor 1601 is configured to support the radio access network device 1600 in performing S404 in FIG. 5, S703 in FIG. 7, S904 in FIG. 9, and/or another process of the technology described in this specification. The transceiver 1602 is configured to support the radio access network device 1600 in performing S704 in FIG. 8. The transceiver 1602 is further configured to send and receive information, or is configured to communicate with another network element (for example, a terminal), and/or is configured to perform another process of the technology described in this specification. Optionally, the radio access network device 1600 may further include a memory 1603, and the memory 1603 is configured to store program code and data that correspond to any one of the foregoing communication methods performed by the radio access network device 1600. The memory 1603 may be a read-only memory (read-only memory, ROM), another type of static storage device capable of storing static information and instructions, a random access memory (RAM), or the like.

The method or algorithm steps described with reference to the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and can write information into the storage medium. Certainly, the storage medium may alternatively be a component of the processor. The processor and the storage medium may be located in an ASIC. In addition, the ASIC may be located in a core network interface device. Certainly, the processor and the storage medium may alternatively exist as discrete components in a core network interface device.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that facilitates transmission of a computer program from one place to another. The storage medium may be any available medium accessible by a general purpose or dedicated computer.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on technical solutions of this application shall fall within the protection scope of this application.

What is claimed is:

1. A communication method, applied to a first terminal, comprising:
receiving one or more pieces of sidelink (SL) carrier configuration information sent by a radio access network device, wherein the SL carrier configuration information comprises bandwidth part (BWP) configuration information, the BWP configuration information comprises one or more resource pools, and one resource pool comprises one or more subchannels;
receiving downlink control information (DCI) sent by the radio access network device, wherein the DCI comprises first indication information, the first indication information is used to indicate a time-frequency resource on a first SL carrier in one or more SL carriers, and the first SL carrier is an SL carrier scheduled by the radio access network device; and
sending data to the second terminal on the time-frequency resource based on the first indication information.

2. The method according to claim 1, wherein the first indication information comprises second indication information and third indication information, the second indication information is used to indicate the first SL carrier, and the third indication information comprises a minimum index of a subchannel scheduled by the radio access network device.

3. The method according to claim 1, wherein a configured subchannel of the communication apparatus is independently numbered in a resource pool, the first indication information further comprises fourth indication information, and the fourth indication information is used to indicate the resource pool scheduled by the radio access network device.

4. The method according to claim 1, wherein the operations further comprises:
uniformly numbering a subchannel of the one or more resource pools in the BWP configuration information from a low frequency to a high frequency.

5. The method according to claim 1, wherein the time-frequency resource comprises a time-frequency resource of the one or more resource pools in the BWP configuration information.

6. A non-transitory computer readable medium storing instructions, that when executed by a processor, cause the processor to perform operations comprising:
receiving one or more pieces of sidelink (SL) carrier configuration information sent by a radio access network device, wherein the SL carrier configuration information comprises bandwidth part (BWP) configuration information, the BWP configuration information comprises one or more resource pools, and one resource pool comprises one or more subchannels;
receiving downlink control information (DCI) sent by the radio access network device, wherein the DCI comprises first indication information, the first indication information is used to indicate a time-frequency resource on a first SL carrier in one or more SL carriers, and the first SL carrier is an SL carrier scheduled by the radio access network device; and
sending data to the second terminal on the time-frequency resource based on the first indication information.

7. The non-transitory computer readable medium according to claim 6, wherein the first indication information comprises second indication information and third indication information, the second indication information is used to indicate the first SL carrier, and the third indication information comprises a minimum index of a subchannel scheduled by the radio access network device.

8. The non-transitory computer readable medium according to claim 6, wherein a configured subchannel of the communication apparatus is independently numbered in a resource pool, the first indication information further comprises fourth indication information, and the fourth indication information is used to indicate the resource pool scheduled by the radio access network device.

9. The non-transitory computer readable medium according to claim 6, wherein the operations further comprises:
uniformly numbering a subchannel of the one or more resource pools in the BWP configuration information from a low frequency to a high frequency.

10. The non-transitory computer readable medium according to claim 6, wherein the time-frequency resource comprises a time-frequency resource of the one or more resource pools in the BWP configuration information.

11. A communication apparatus, applied to a first terminal, comprising:
at least one processor, and a non-transitory memory storing instructions for execution by the at least one processor, wherein, when executed, the instructions cause the communication apparatus to perform operations comprising:
receiving one or more pieces of sidelink (SL) carrier configuration information sent by a radio access network device, wherein the SL carrier configuration information comprises bandwidth part (BWP) configuration information, the BWP configuration information comprises one or more resource pools, and one resource pool comprises one or more subchannels;
receiving downlink control information (DCI) sent by the radio access network device, wherein the DCI comprises first indication information, the first indication information is used to indicate a time-frequency resource on a first SL carrier in one or more SL carriers, and the first SL carrier is an SL carrier scheduled by the radio access network device; and
sending data to the second terminal on the time-frequency resource based on the first indication information.

12. The communication apparatus according to claim 11, wherein the operations further comprises:
uniformly numbering a subchannel of the one or more resource pools in the BWP configuration information from a low frequency to a high frequency.

13. The communication apparatus according to claim 11, wherein the time-frequency resource comprises a time-frequency resource of the one or more resource pools in the BWP configuration information.

14. The communication apparatus according to claim 11, wherein the first indication information comprises second indication information and third indication information, the second indication information is used to indicate the first SL carrier, and the third indication information comprises a minimum index of a subchannel scheduled by the radio access network device.

15. The communication apparatus according to claim 11, wherein a configured subchannel of the communication apparatus is independently numbered in a resource pool, the first indication information further comprises fourth indication information, and the fourth indication information is used to indicate the resource pool scheduled by the radio access network device.

* * * * *